United States Patent
Lauve, IV et al.

(10) Patent No.: US 11,102,955 B2
(45) Date of Patent: *Aug. 31, 2021

(54) AUTOMATIC ANIMAL FEEDER

(71) Applicant: Solunartek, LLC, Fairfield, CT (US)

(72) Inventors: Jules J. Lauve, IV, Bridgeport, CT (US); Jules J. Lauve, III, Bridgeport, CT (US)

(73) Assignee: Solunartek, LLC, Fairfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,947

(22) Filed: Oct. 5, 2020

(65) Prior Publication Data

US 2021/0127631 A1    May 6, 2021

Related U.S. Application Data

(63) Continuation of application No. 15/842,769, filed on Dec. 14, 2017, now Pat. No. 10,810,527.

(60) Provisional application No. 62/485,727, filed on Apr. 14, 2017.

(51) Int. Cl.
*A01K 5/02* (2006.01)

(52) U.S. Cl.
CPC ................... *A01K 5/0291* (2013.01)

(58) Field of Classification Search
CPC ................... A01K 5/0291; A01K 5/0216
USPC ... 119/51.1, 51.02, 51.11, 51.5, 57.91, 57.92
See application file for complete search history.

(56) References Cited

U.S. PATENT DOCUMENTS

| | | | | |
|---|---|---|---|---|
| 4,989,547 A | * | 2/1991 | Eaton | A01K 5/0291 119/51.11 |
| 5,143,289 A | * | 9/1992 | Gresham | A01K 5/0291 239/7 |
| 5,299,529 A | * | 4/1994 | Ramirez | A01K 5/0291 119/51.11 |
| 5,692,125 A | * | 11/1997 | Schloss | G06Q 10/06 705/7.16 |
| 5,808,294 A | * | 9/1998 | Neumann | G05B 19/0426 250/214 AL |

(Continued)

FOREIGN PATENT DOCUMENTS

WO    WO 2016/073017 A1    5/2016

OTHER PUBLICATIONS

International Search Report and Written Opinion, dated Jun. 22, 2018, for International Application No. PCT/US2018/027491 (15 pages).

(Continued)

*Primary Examiner* — Ebony E Evans
(74) *Attorney, Agent, or Firm* — Finnegan, Henderson, Farabow, Garrett & Dunner, LLP

(57) ABSTRACT

An automatic feeding device for animals is described herein. The automatic feeding device includes a hopper and a dispenser. The hopper includes a bulk container for storing feed and a feed outlet. The dispenser includes an enclosure containing a power source, an electric motor, and a controller. The dispenser also includes dispensing means connected to the electric motor and configured to dispense feed received from the feed outlet when the electric motor is energized. The controller can be configured to energize the electric motor according to a schedule based at least in part on a selection of at least one astronomical event and at least one corresponding offset time.

19 Claims, 9 Drawing Sheets

(56) References Cited

U.S. PATENT DOCUMENTS

| | | | | | |
|---|---|---|---|---|---|
| 5,926,441 | A | * | 7/1999 | Zinsmeyer | A01K 5/0291 368/10 |
| 6,182,606 | B1 | * | 2/2001 | Wells | A01K 5/0275 119/51.11 |
| 6,427,628 | B1 | * | 8/2002 | Reece | A01K 5/0291 119/51.11 |
| 6,452,871 | B1 | * | 9/2002 | Sotelo | A01K 5/0291 119/51.11 |
| 6,680,877 | B1 | * | 1/2004 | Lienau | G04G 3/00 33/269 |
| 7,222,583 | B2 | * | 5/2007 | Foster | A01K 61/80 119/57.91 |
| 7,275,501 | B1 | * | 10/2007 | Laceky | A01K 5/02 119/57.91 |
| 8,555,812 | B2 | * | 10/2013 | Nowacek | A01K 5/02 119/51.02 |
| 8,683,948 | B2 | * | 4/2014 | Gerke | A01K 5/0225 119/57.91 |
| 9,485,960 | B2 | | 11/2016 | Leissner | |
| 9,743,641 | B1 | * | 8/2017 | Attard | A01K 5/0291 |
| 9,854,784 | B2 | * | 1/2018 | Frieden | A01K 5/02 |
| 2004/0162799 | A1 | | 8/2004 | Schisler et al. | |
| 2005/0284381 | A1 | * | 12/2005 | Bell | A01K 5/02 119/51.02 |
| 2007/0181513 | A1 | * | 8/2007 | Ward | A47F 1/04 211/59.2 |
| 2009/0020073 | A1 | * | 1/2009 | Hansen | A01K 5/0291 119/51.11 |
| 2009/0120369 | A1 | * | 5/2009 | Lewis | A01K 5/0225 119/51.01 |
| 2010/0307421 | A1 | * | 12/2010 | Gates | A01K 39/012 119/56.1 |
| 2011/0044350 | A1 | * | 2/2011 | Green | H04J 3/0641 370/403 |
| 2013/0036978 | A1 | * | 2/2013 | Morris | A01K 5/02 119/51.11 |
| 2013/0157648 | A1 | * | 6/2013 | Boenker, IV | A01K 5/02 455/420 |
| 2013/0186342 | A1 | * | 7/2013 | Salinas | A01K 5/02 119/51.11 |
| 2014/0116341 | A1 | | 5/2014 | Kopic et al. | |
| 2014/0317631 | A1 | | 10/2014 | Ryshakov et al. | |
| 2015/0272079 | A1 | * | 10/2015 | Evans | A01K 5/0225 119/51.01 |
| 2019/0014742 | A1 | * | 1/2019 | Leggett | A01K 5/0275 |

OTHER PUBLICATIONS

Brown Jr., Frank A., "Persistent Activity Rhythms in the Oyster," *American Journal of Physiology*, Sep. 1954, vol. 178, Issue 3, pp. 510-514. Retrieved from www.physiology.org/journal/ajplegacy.

Knight, John Alden, *Moon Up Moon Down*, Solunar Sales Co., 1972, Montoursville, PA, pp. 6-7, 54-55, 66-69, 94-95.

Sullivan, Jeffery D. et al., "Movement with the Moon: White-tailed Deer Activity and Solunar Events," *Journal of the Southeastern Association of Fish and Wildlife Agencies*, Mar. 2016, vol. 3, pp. 225-232.

\* cited by examiner

US 11,102,955 B2

AUTOMATIC ANIMAL FEEDER

CROSS-REFERENCE TO RELATED APPLICATIONS

This application is a continuation of U.S. application Ser. No. 15/842,769, filed Dec. 14, 2017, now U.S. Pat. No. 10,810,527, issued on Oct. 20, 2020, which claims benefit of U.S. Provisional Application Ser. No. 62/485,727 filed Apr. 14, 2017. Each of the above applications is incorporated herein by reference in its entirety.

TECHNICAL FIELD

The present disclosure relates generally to feeding devices for stock or game. In particular, the present disclosure relates to an automatic animal feeder with configurable task scheduling.

BRIEF DESCRIPTION OF DRAWINGS

The accompanying drawings, which are incorporated in and constitute a part of this specification, illustrate the disclosed embodiments and together with the description, serve to explain the principles of the various aspects of the disclosed embodiments. In the drawings.

Figure 1:
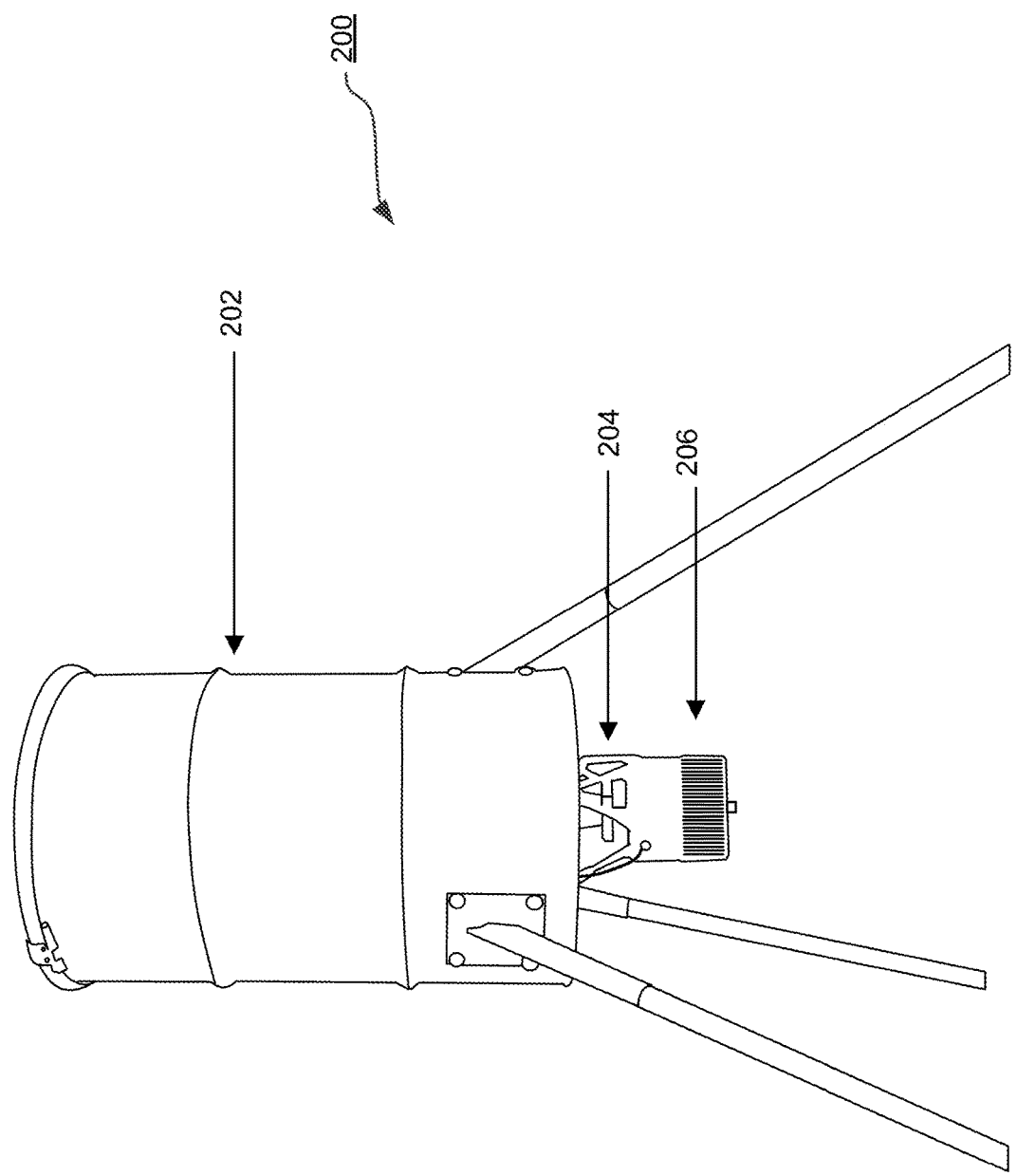
FIG. 1 illustrates an exemplary automatic broadcast deer feeder.

It is to be understood that both the foregoing general description and the following detailed description are exemplary and explanatory only and are not restrictive of the claims.

DESCRIPTION OF EXEMPLARY EMBODIMENTS

Reference will now be made to certain embodiments consistent with the present disclosure, examples of which are illustrated in the accompanying drawings. Wherever possible, the same reference numbers are used throughout the drawings to refer to the same or like parts.

Hunters and animal owners, such as pet owners, zoos, and aquariums, may use automatic feeders to dispense feed and nutrients on a regular schedule to nourish animals. Hunters may feed deer, for example, to improve their antler growth and to attract them to a hunting area to improve the hunter's harvest. The feed may be broadcast by a motorized dispenser energized by a timer acting on a schedule of user-defined set-times. Automatically dispensing feed may eliminate the need for physical intrusion into the geographic area to perform the feeding task. Automatic feeding may be scheduled using, for example, a scheduling device. Hunters or others, such as photographers, may also want to take photographs or video recordings of animals.

An automatic animal feeder may be scheduled to perform tasks (e.g., dispense feed) or cause another device to perform a task (e.g. cause a camera to take a photograph). The tasks may be performed based on predicted times of animal activity or predicted animal behavior. An automatic animal-feeder can be configured using a scheduling device. Some scheduling devices may limit task performance to specific times of a 24-hour day. Some scheduling devices may require the collection of historical data over a period of time to estimate upcoming sunrise and sunset times. Some scheduling devices may prohibit scheduling task completion times relative to lunar events. Some scheduling devices may set task schedules that depend on estimates of when lunar transits happen but prohibit scheduling based on actual lunar data. Some scheduling devices may prohibit scheduling tasks based on environmental data.

Because the scheduling devices may require that data entry and calculations be performed using an interface on the automatic animal feeder, physical access to the geographic area of the automatic animal feeder may be required in order to schedule set-times, confirm upcoming set-times, change the set-times, test the timer and dispenser for operability, or check the levels of the batteries.

Further, some scheduling devices may not report the amount of animal feed remaining in the automatic animal feeder.

The disclosed methods and apparatus are directed to overcoming one or more of the problems set forth above and/or other problems or shortcomings in the prior art.

The present disclosure describes an automatic animal feeder suitable for scheduling tasks based on predicted animal behavior. Such a feeder may include, for example, a timer for feeding animals and may be configured using a scheduling device, such as a mobile device or personal computer. The timer may be a deer-feeder timer. The timer may be scheduled based on, for example, at least one of the feeder's location, the time of day, recurring times, or astronomical events. Astronomical events may include solar events, lunar events, or solunar events based on solunar theory (e.g., a position of Earth's moon in relation to the phase of Earth's moon). The schedule for performing one or more tasks may be generated on the scheduling device and may be conveyed wirelessly to the timer or through a cable connection. The scheduling device may communicate wirelessly with the timer using a wireless communication protocol such as Bluetooth Low Energy (BLE) v. 4.0 and/or 4.1. In some embodiments, schedule generation may be performed on the timer. In some embodiments, functions that are described as being performed on a timer or on a scheduling device may be performed on a single device.

The timer may be scheduled based on events, such as 24-hour clock events or times, solar events, or lunar events, or any combination thereof. Solar events may include sunrise, sunset, or both. Solar events may be used to predict cyclical animal behavior. For example, deer, being crepuscular, may be active immediately after dawn and immediately before dusk. Deer may be likely to feed during these periods of activity. Hunters using automatic feeders may schedule the automatic dispensing of feed shortly before sunrise, shortly before sunset, or both. In addition or instead of activity and behavior around sunrise and sunset, other periods of animal activity may occur in relation to the position of the moon. Regular periods of activity may occur when the moon is overhead, underfoot, or both. These times may correspond with times of high tide. Shorter periods of activity may occur at moonrise, moonset, or both. Regular periods of activity may occur at moonrise, moonset, or both. Shorter periods of activity may occur when the moon is overhead, underfoot, or both. Activity may be predicted at a time that is an offset from any of the aforementioned events. The positions of the sun, moon, and earth and their relation to and alignment with each other may determine how much activity occurs during a given period of activity. The level of development of a given species of animal may, in part, determine its response lag to a solunar event. For example, a lesser developed species (e.g., gnats or flies) may respond immediately, medium-developed species (e.g., fish) may respond almost immediately, while the response lag of a highly developed species (e.g., deer or bear) may be up to an hour or so after a lunar event.

In some embodiments, a device, such as a timer, may control an automatic feeder to dispense animal feed from a bulk hopper based on set-times that the user may generate using a software application running on a scheduling device, such as a smartphone or other device (e.g., wireless-enabled device). The user may input, for example, the current date and time; the feeder's geographical location; or set-times to dispense feed. The user may choose set-times of, or off-sets from, for example, a 24-hour clock time or solunar event times based on positions of the earth, sun, and moon. The scheduling device may perform a method of arbitrating between set-times when they conflict within a certain margin or conflict window of time (e.g., if two times for performing a task are within five minutes of each other). The scheduling device may transmit the schedule remotely to the timer. This may eliminate the need for disruptive physical access to the hunting area. The timer may send information to the scheduling device running the scheduling application, such as confirmation of receipt of schedule; status of the batteries powering the timer and the dispenser; status of the timer's back-up batteries; or an invitation to remotely test the timer to confirm timer and dispenser operability. The timer may trigger the performance of a task on the custom schedule. For example, the timer connected to a food dispenser may energize the dispenser to dispense food on the custom schedule.

In some embodiments, the scheduling device may provide a user with the ability to track actual sunrise, sunset, sun overhead, and/or sun underfoot at the timer's location or to establish set-times as off-sets from, and in advance of or after, sunrise, sunset, sun overhead, and/or sun underfoot. Calculations of sunrise, sunset, sun overhead, and/or or sun underfoot may be accomplished using a solar orbit model. In some embodiments the scheduling device may provide a user with the ability to track actual moonrise, moonset, moon overhead, and/or moon underfoot at the device's location or to establish set-times as off-sets from, and in advance of or after, moonrise, moonset, moon overhead, and/or moon underfoot. For example, set-times may be established five minutes before moonrise. In some embodiments, the scheduling device may permit scheduling precise set-times of upper and lower lunar transits based on a calculation of the moon's actual and identifiable phases, orbit and/or orbital perturbations. Calculation of the moon's phases, orbit and/or perturbations therein may be accomplished using a lunar orbit model. Calculation of the moon's phases, the moon's orbit around the earth, and/or the earth's orbit around the sun may allow the user to identify times when the greatest level of animal activity may occur. The calculations of the solar orbit model and/or the lunar orbit model may be based on and updated based on astronomical data published in publicly available sources such as data published by the National Aeronautics and Space Administration. The calculations of the solar orbit model and/or the lunar orbit model may be based on locally stored equations and updated by referencing astronomical data published in publicly available sources such as data published by the National Aeronautics and Space Administration.

In some embodiments, a scheduling device may contain reporting features or means to notify a user in advance of the upcoming schedule of actual set-times when the automatic animal feeder will perform a task. In some embodiments, the scheduling device may provide means to schedule set-times relative to lunar events and to confirm the upcoming set-time, change the set-times, test the timer and dispenser for operability, or check the levels of the batteries. This may be done with or without physical access to the automatic animal feeder.

Figure 2:
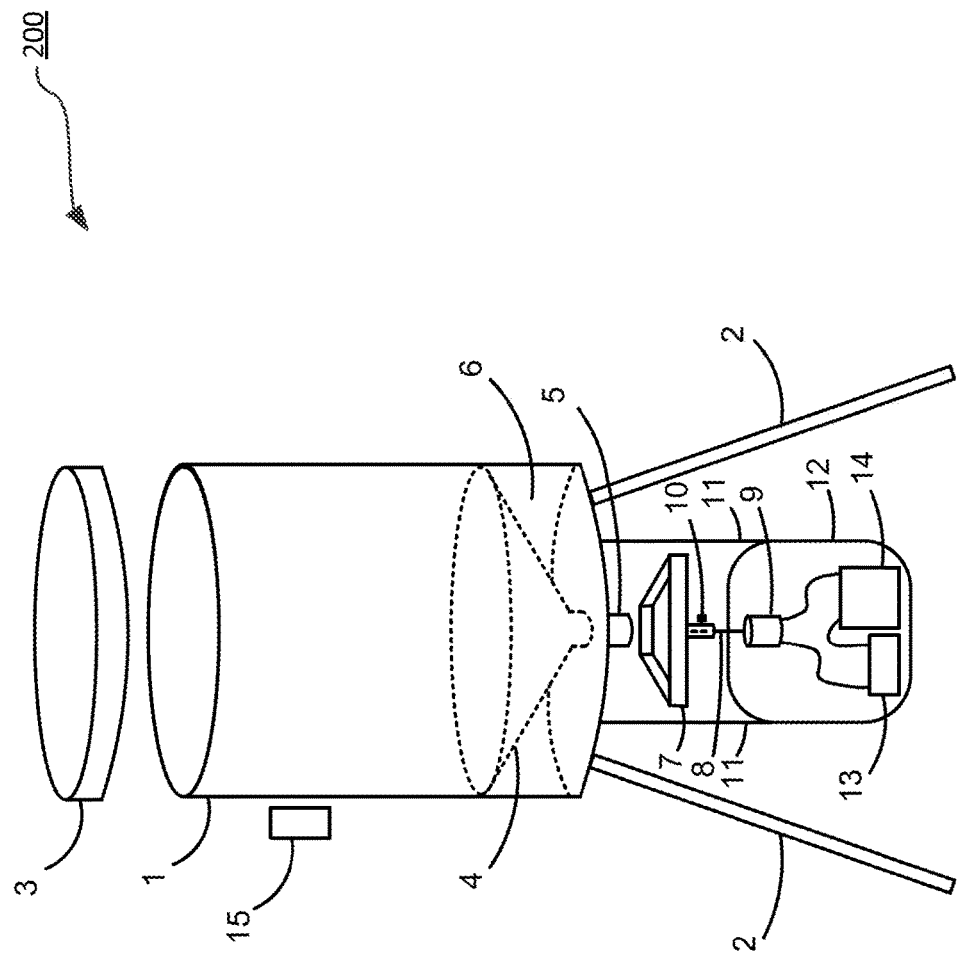
FIG. 2 illustrates components of an exemplary automatic broadcast deer feeder.

FIG. 1 is an example of an automatic broadcast deer feeder 200 ("feeder 200"), comprised of a hopper 202 and a dispenser 204 with a controller 206. FIG. 2 is a detailed illustration of feeder 200. The hopper may comprise various parts and sections, such as a drum 1, a tripod 2, a removable lid 3, a funnel 4, a funnel stem 5, and an unused void 6. Drum 1 may be used as a bulk container for dried corn, protein nuggets, or other types of animal feed. Drum 1 may be mounted on tripod 2. Drum 1 may be modified by removing the top. A removable lid 3 may be added. A hole may be cut in the center of the bottom of the drum. A funnel 4 may be installed inside drum 1 with funnel stem 5 extending below the bottom of drum 1. The top rim of funnel 4 may be sealed to the inside of the drum to prevent feed from falling into unused void 6 between funnel 4 and drum 1. The dispenser may comprise a spinner plate 7, a shaft 8, an electric motor 9, a set screw 10, one or more hangers 11, a weather resistant enclosure 12, and a controller comprising a battery 13 and a timer 14. Spinner plate 7 may be mounted on the end of shaft 8 of electric motor 9 and fixed in place on shaft 8 by set screw 10. Spinner plate 7 may be positioned below funnel stem 5. The vertical position of spinner plate 7 in relation to funnel stem 5 of funnel 4 may be controlled by adjusting hangers 11, which may be attached to the underside of drum 1 and from which weather resistant enclosure 12 may hang and house electric motor 9, battery 13, and timer 14. Timer 14 may have an internal relay. Spinner plate 7 may be normally static and cause feed flowing from drum 1 to pile-up on spinner plate 7, thus stopping the flow of feed out of drum 1. Battery 13 may power timer 14. Internal relay in timer 14 may close, thus completing a circuit between battery 13 and the electric motor 9. Electric motor 9 may energize, thus spinning spinner plate 7 and broadcasting feed around feeder 200 and allowing additional feed to flow onto spinner plate 7 until it stops spinning. Outside weather resistant enclosure 12, which may house battery 13, timer 14, and electric motor 9, may be a solar cell 15, which may charge battery 13. Such charging may be continuous or intermittent.

Figure 3:
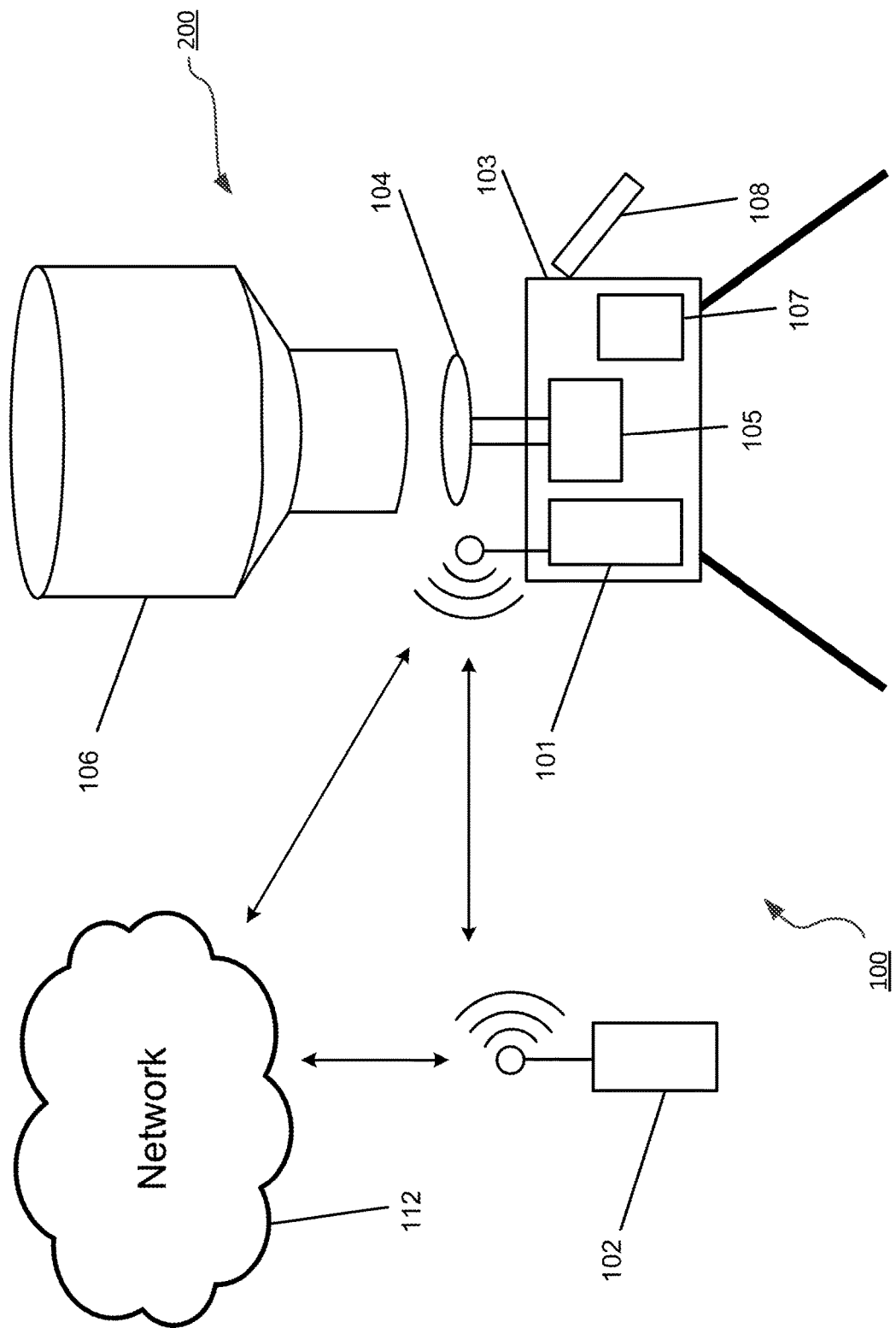
FIG. 3 illustrates an exemplary system for scheduling tasks based on predicted animal behavior.

FIG. 3 is an example of a system 100 for scheduling tasks based on predicted animal behavior. The illustrated system 100 is for scheduling the broadcasting of deer feed from a deer feeder, but system 100 may be used to schedule other tasks instead or in addition to animal feeding. System 100 may comprise a scheduling device such as smart device 102, a network 112, and a feeder 200, which may be designed to operate in communication with smart device 102. In some embodiments, system 100 for scheduling tasks based on predicted animal behavior may be implemented without a smart device (e.g., by allowing direct interfacing between a user and feeder 200). Feeder 200 may comprise a timer device 101. Smart device 102 may wirelessly communicate with a timer device 101, which may be connected to a motor 105. This communication may be direct or through a network 112. Timer device 101 and motor 105 may be powered by a battery 107 (i.e., a "main battery 107"). Main battery 107 may be recharged by a solar panel 108. In some embodiments, more than one battery or other sources of electricity may be used. The connections between timer device 101, motor 105, and solar panel 108 are discussed below with respect to FIG. 4. Motor 105 may be energized to spin a plate 104 and broadcast corn or other bait or feed dispensed via gravity from a hopper 106.

Figure 4:
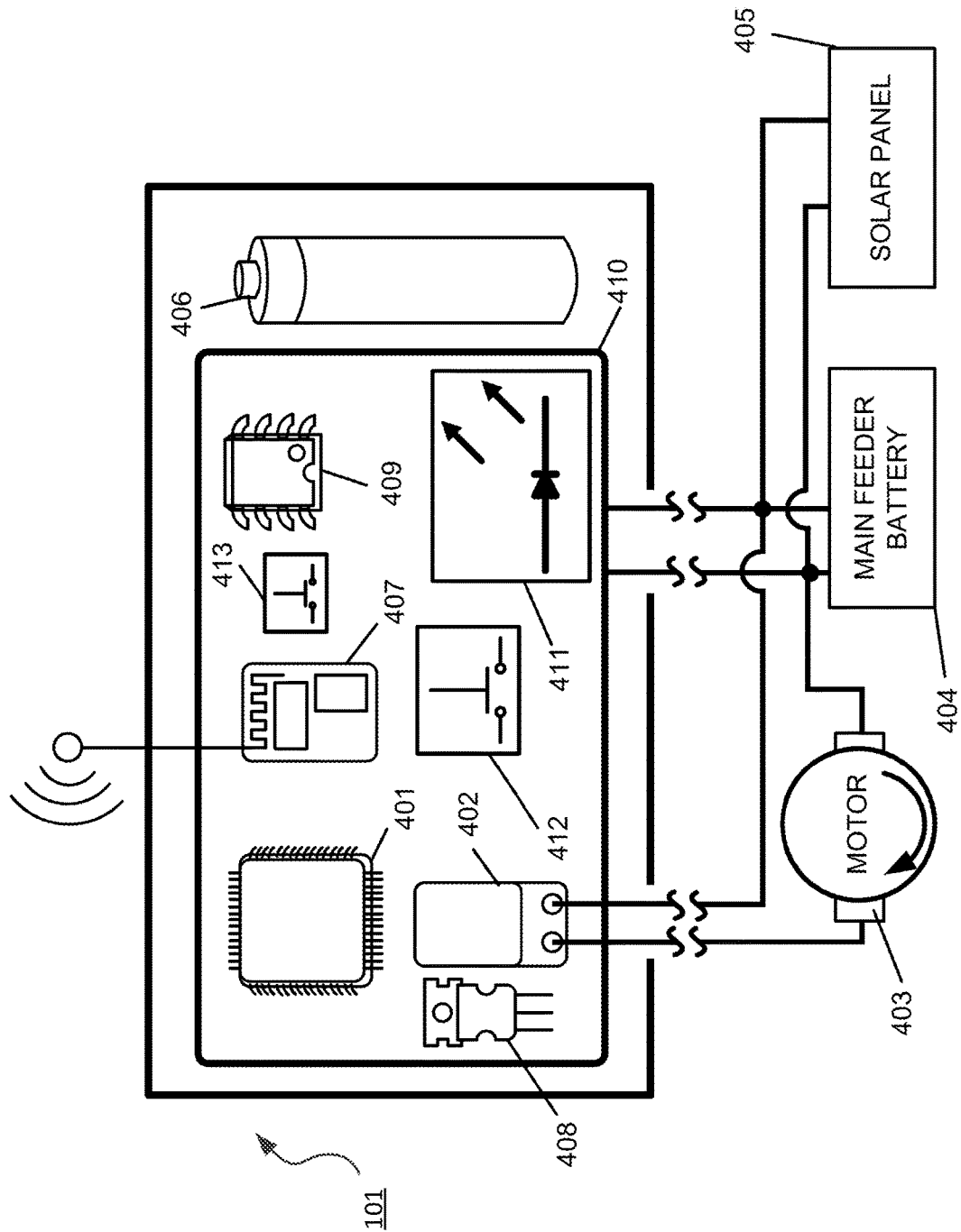
FIG. 4 illustrates an exemplary timer device.

FIG. 4 is an exemplary system drawing of timer device 101. Timer device 101 may comprise, for example, a microcontroller unit ("MCU 401"), a relay 402, a voltage regulator 408, a radio 407, a light source 411, a first button 412, a second button 413, and a real-time clock 409. These components may be mounted on a printed circuit board ("PCB P10"). Timer device 101 may be equipped with an internal backup battery 406. MCU 401 may be programmed with firmware, discussed below with respect to FIG. 8. MCU 401 may execute a feeding schedule calculated according to rules selected by the user via smart device 102. In certain embodiments, timer device 101 may actuate the performance of a task other than or in addition to feeding, such as actuating a camera to take a photograph or a video recording. Using an application on smart device 102, a user may configure a schedule for activating the dispenser or, more generally, for performing a task. Smart device 102 may transmit the schedule to timer device 101. At times indicated by the received schedule, timer device 101 may close relay 402 to energize the battery-powered electric motor 403 to dispense feed. Timer device 101 may include onboard environmental sensors (not shown) to contribute to data logging and reporting during application updates, as discussed below. Data from the environmental sensors may be used to create or adjust a schedule for feeding. In some embodiments, the environmental sensors may be located off of PCB 410. The timer device may comprise at least one of a real-time clock 409, a motor current sensor (not shown), a temperature sensor (not shown), a humidity sensor (not shown), a barometric pressure sensor (not shown), a solid state auto-resetting over-current protection device, an input polarity sensor (not shown), a switching voltage input sensor (not shown), or a back-up battery. One or more oscillators (not shown) may be used in timer device 101, such as with real-time clock 409 or MCU 401. The one or more oscillators may produce less than a certain amount of noise at one or more frequencies at a sound pressure level which is below the threshold of a deer's range of hearing.

In the illustrated embodiment, the MCU 401 is portrayed as a single package comprising a microprocessor, Random Access Memory ("RAM"), and non-volatile storage. In another embodiment, any of these components may be installed as separate packages. In the depicted embodiment, the MCU 401 is portrayed as separate from radio 407. In another embodiment, they may be integrated. In the illustrated embodiment, smart device 102 comprises programmable consumer hardware such as a smartphone, tablet, or personal computer. In some embodiments, smart device 102 is a dedicated remote control device running factory-installed firmware for one or more of the described use-cases. In the depicted embodiment, smart device 102 and timer device 101 are separate devices, so that timer device 101 can be reconfigured at a distance, minimizing human presence that might intimidate wildlife. In another embodiment, the functionality of smart device 102 and timer device 101 may be incorporated into a single device with, for example, controls mounted directly on timer device 101. In the depicted embodiment, only one backup battery 406 is shown. In another embodiment, multiple backup batteries may be present. In the depicted embodiment, smart device 102 may gather location data and include it in the schedule configuration. In another embodiment, timer device 101 may itself contain a component, such as a Global Positioning System ("GPS") module, for the purpose of gathering location data and rendering the schedule.

Timer device 101 may be in an enclosure, such as weather resistant enclosure 12. Timer device 101 may maintain a vertical "portrait" form factor. Timer device 101 may have a connector on its side. The timer device may include a magnet used to secure timer device 101 to the interior of a metal weather resistant enclosure 12 or another structure in which timer device 101 may reside in the field. Timer device 101 may have one or more buttons for testing, programming, re-setting, and waking the device.

Timer device 101 may be connected to main battery 404 and motor 403 using a connector ("main cable assembly"). The main cable assembly may comprise multiple conductors and a multi-pin, male, keyed connector. A multi-pin connector on one end may mate with the panel-mount connector on weather resistant enclosure 12. Two wires may connect timer device 101 to the main battery 404 and two wires may connect timer device 101 to the motor circuit. In some embodiments, the motor cable assembly may comprise two conductors. One end may have bare wires to wire-nut to the two permanent wires on motor 403. The other end of the motor cable assembly may have a polarized connector to mate with the main cable assembly.

Light source 411 may be an internal Light Emitting Diode ("LED"). Light source 411 may illuminate a logo, may aid in troubleshooting, and/or may indicate activity status. Light source 411 inside timer device 101 may function as a pilot light and may light steady, blink, or "breathe" in various colors depending on function. During normal operation inside the controller box all lighting function can be disabled to, for example, not frighten deer. Light source 411 may back-light a logo in the front of the enclosure. Light source 411 may be visible on and flush with the outside of timer device 101. Light source 411 may or may not protrude beyond timer device's 101 exterior. When smart device 102 is connected to timer device 101 and a TEST signal is sent, light source 411 may blink rapidly during a countdown to a test and then stay on steady or blink rapidly during the duration of the test. When the user wishes to test or program the timer when it is not connected to main battery 404, the user may awaken timer device 101 by pressing a button on the timer. Light source 411 may "breathe" gently to let the user know the timer is awake and Bluetooth is ready. After a period of inactivity light source 411 may fade out and timer device 101 may return to sleep.

Timer device 101 may have one or more buttons, such as first button 412 and second button 413. First button 412 may be an easy-to-operate momentary button. First button 412 may be flush-mounted on the front of timer device 101 or on the side of the timer device 101. First button 412 may have several functions based on length of time it is pushed and/or the number of pushes within a period of time. Pressing first button 412 may awaken timer device 101 for connection via a wireless protocol to smart device 102 or to conduct a test with no involvement from smart device 102. A second button 413 may be operated by, for example, the tip of a ballpoint pen or the like. Its function may be to allow a user to reset timer device 101 to factory settings, such as in the event of a malfunction.

One source of electrical power for timer device 101 may be main battery 404. Main battery 404 may be a separate, sealed lead-acid battery that powers the timer and/or motor 403. Main battery 404 may be, for example, a 12 V DC or a 6 V DC battery. Backup battery 406 may be mounted on PCB 410 or not mounted on PCB 410, as illustrated in FIG. 4. Solar panel 405 may charge main battery 404. When timer device 101 is not connected to main battery, backup battery 406 may power components such as the onboard real-time clock, the onboard microcontroller, and the onboard Bluetooth radio. Backup battery 406 may provide power when a user wakes timer device 101 using a wireless protocol for programming or learning. Levels of main battery 404, backup battery 406, or both may be retrieved from timer device 101 by downloading either a snapshot log or a full log, as discussed below. Timer device 101 may identify when leads to main battery 404 have been connected in reverse polarity. Light source 411 on timer device 101 may blink in specific color and rapid manner to notify the user of a wiring error.

Figure 5:
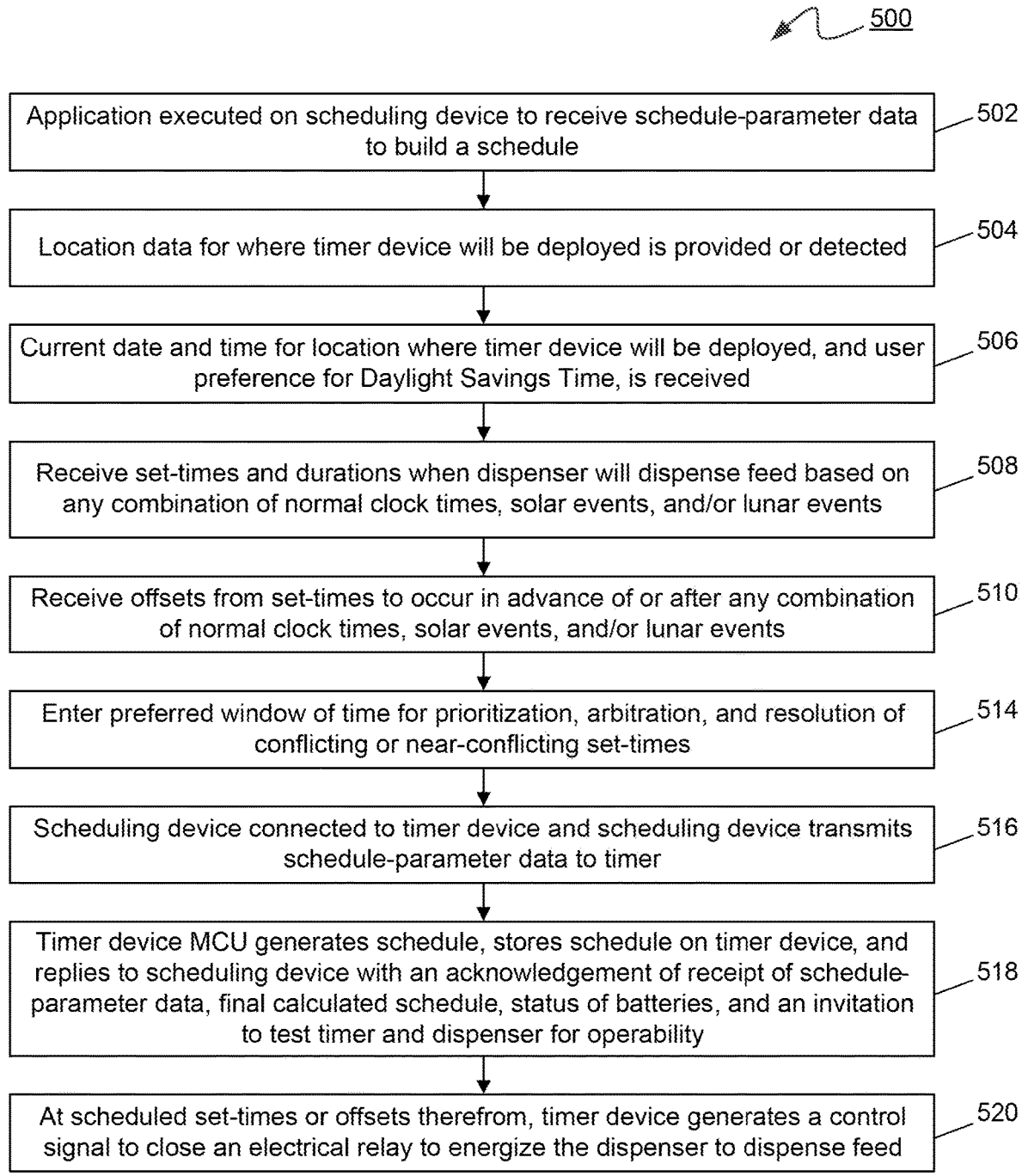
FIG. 5 is a flow diagram illustrating an exemplary method for scheduling tasks based on predicted animal behavior.

Using an application on smart device 102, a user may configure any combination of several kinds of schedules for performing a task, such as: 24-hour daily clock times (e.g., "7:00 AM and 4:30 PM"); sunrise and sunset, or offsets therefrom (e.g., "30 minutes before sunrise"); moon overhead and moon underfoot or offsets therefrom; or moonrise and moonset or offsets therefrom. The time or times at which a task is to be performed is a set-time. The schedule's set-times may indicate when the scheduling device should perform a task or instruct another device to perform a task. A set-time may have a unique duration, such as five seconds. The application on smart device 102 may be used to perform other functions, such as: enter a security code to modify the timer's operation; assign or edit the timer's name; conduct a test; send a schedule; retrieve a snapshot of onboard data; or retrieve a full log of past activity. FIG. 5 is an example of a process 500 by which timer device 101 may operate. At step 502, an application to enter schedule-parameter data to build a schedule may be executed. This may be done on a scheduling device (e.g., a smartphone or other smart device with wireless communication capabilities) such as smart device 102. At step 504, a location where timer device 101 will be deployed may be entered manually, detected automatically using a GPS function of the scheduling device, or via Wi-Fi network service location. At step 506, the current date and time at the location where timer device 101 will be deployed may be entered. Additionally, a preference for using Daylight Saving Time may be entered. At step 508, set-times and durations when dispenser will dispense feed based on any combination of normal clock times, sunrise and sunset, moonrise and moonset, and lunar transits may be entered. At step 510, offsets from set-times to occur in advance of or after solar events may be entered. At step 510, offsets from set-times to occur in advance of or after lunar events may be entered. The offsets from set-times may be based on, for example, the level of development of the species of animal being fed. The application may suggest or automatically set the offsets if a species of animal is selected. Selection of an animal species may permit the scheduling device to automatically schedule the off-set of set-times to match the response lag of that species or to set other settings in addition to or instead of the set-times (e.g., how much food to broadcast). Selection of whether or not the current date falls in Hunting Season or Off-Season may also influence the recommended or default set-times and/or durations of feeding. At step 514, a conflict window of time for arbitration of conflicting or near-conflicting set-times may be entered. For example, a user may enter five minutes as a conflict window of time and the scheduling device may flag two or more set-times as conflicting if they are within five minutes of each other. A conflict-resolution priority designation for set-time types may also be entered as set-time priority data. For example, a user may specify that tasks or other feed set-times that depend on solar events take precedence over tasks or other feed set-times that depend on lunar events. At step 516, the scheduling device may be connected to timer device 101 and the scheduling device may transmit schedule data to timer device 101. The connection may be wireless via a wireless communication protocol (e.g., Bluetooth). At step 518, MCU 401 may calculate a schedule based on the schedule-parameter data, store the schedule on timer device 101, and reply to the scheduling device with, for example, an acknowledgement of receipt of the schedule-parameter data, the final calculated schedule, the status of batteries, and an invitation to test timer device 101 and dispenser for operability. In some embodiments, the scheduling device may calculate a schedule based on schedule-parameter data and transmit the schedule to timer device 101. The schedule and the schedule-parameter data may each or both be referred to as "schedule data." At step 520, timer device 101 may send a control signal to close an electrical relay to energize the dispenser's motor to dispense feed according to the final calculated schedule. The control signal may be sent at scheduled set-times or offsets therefrom. In some embodiments, the application may generate a notification before, during, or after one or more feed set-times. Such notification may be displayed on smart device 102 (including, for example, an accessory such as a smart watch), and/or a personal computer. The feed schedule may be displayed on smart device 102 (including, for example, an accessory such as a smart watch), and/or or a personal computer.

Timer device 101 may provide a snapshot log of a current schedule and information on the timer device's 101 status, as well as a full log of past data. A snapshot log may be basic information about timer device 101 and a current schedule. A full log may be up to multiple years of data. The log data may include, for example: date; time of day; task type; task duration (e.g., seconds that feed was dispensed); whether a possible event was acted upon or not and, if not, then why (e.g., not programmed to act, battery level too low or disconnected, arbitration settings prevented acting); temperature; atmospheric pressure; dispenser motor load measured in amperes; and a date that scheduled tasks were not acted upon due to no-load (e.g., indicating empty hopper).

Figure 6:
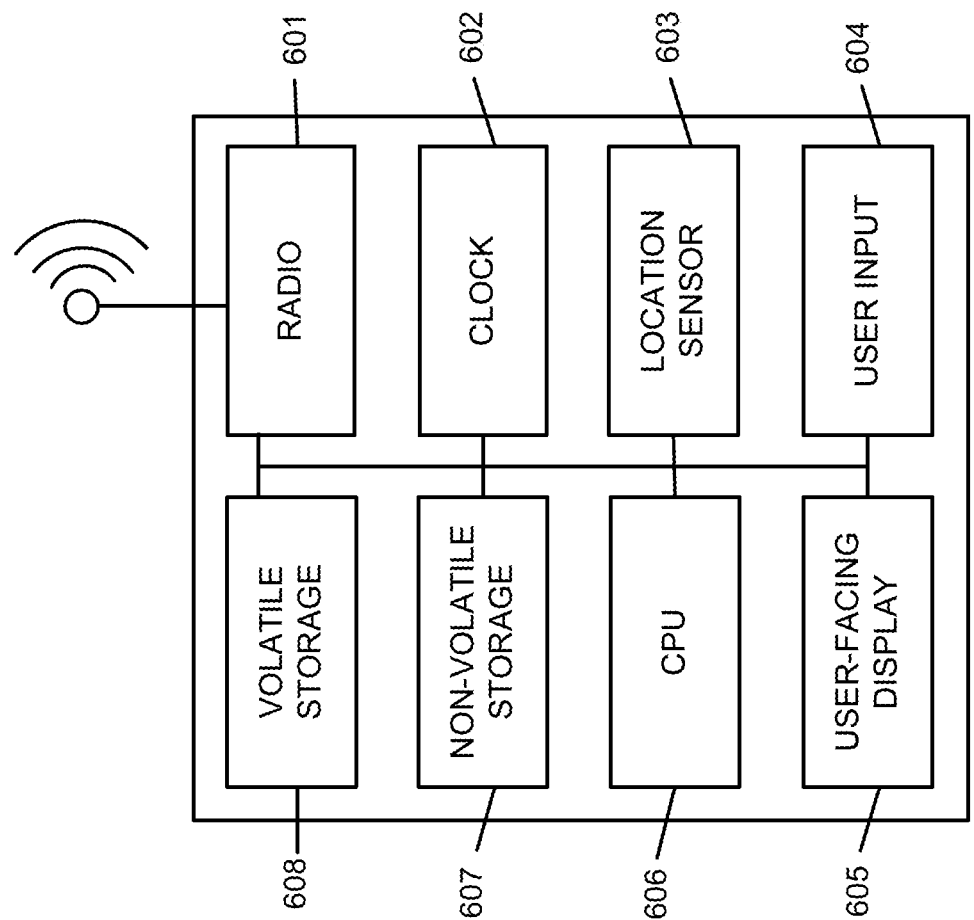
FIG. 6 illustrates an exemplary smart device.

FIG. 6 is an example of smart device 102, comprising a central processing unit 606, volatile storage 608, nonvolatile storage 607, a radio 601, a real-time clock 602, a location sensor 603 (such as a GPS module, cellular radio, or other location-sensing component), and a user-facing display 605 and input device 604. The smart device may be programmed with software that reads user input, connects wirelessly to timer device 101, and may transmit user-specified schedule-parameter data. In an embodiment, the smart device may be portable commodity hardware such as a tablet or smartphone. In some embodiments, only the requisite software and timer device 101 may be distributed to the user.

Figure 7:
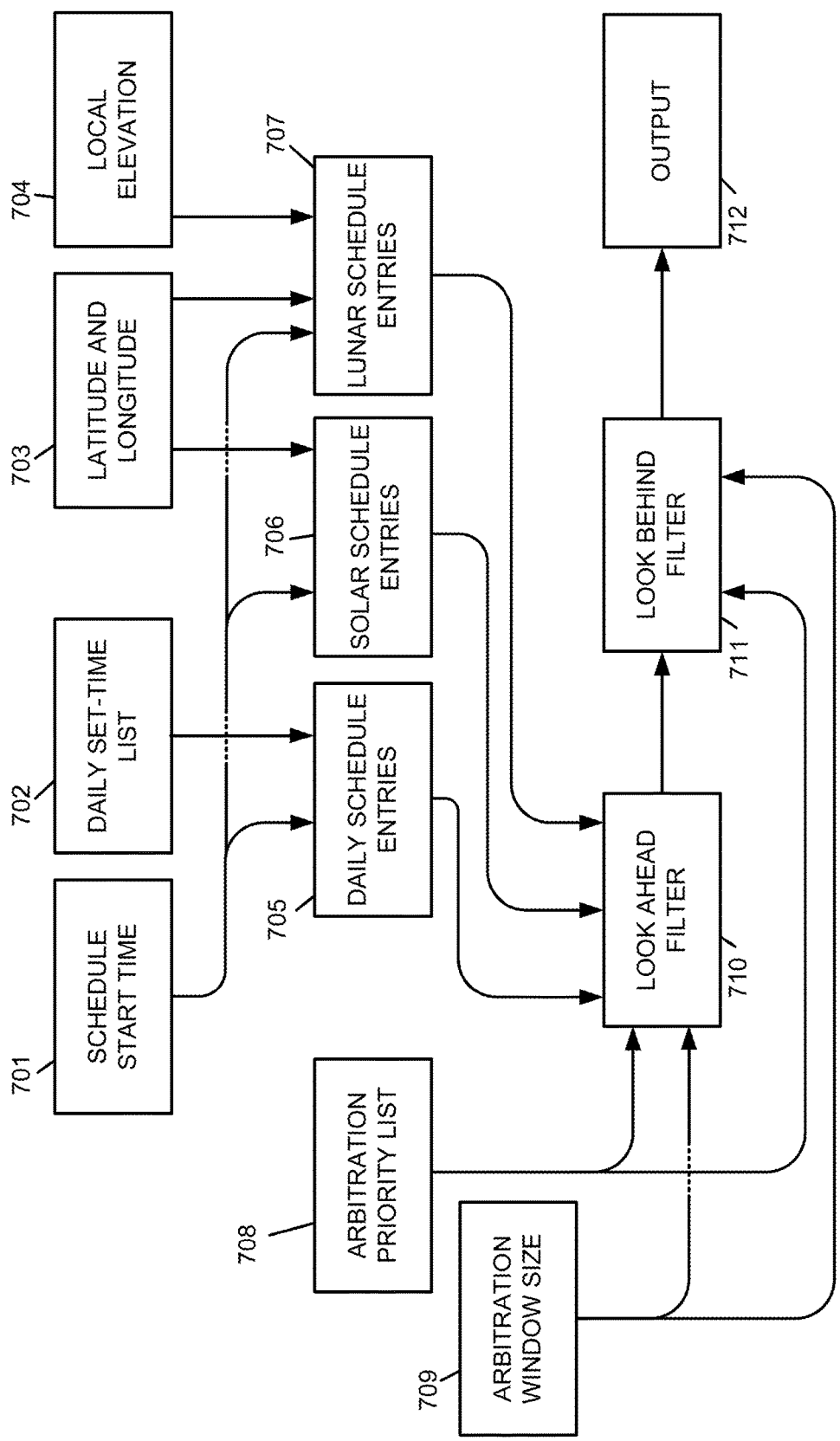
FIG. 7 illustrates data dependencies that may be involved in generating a schedule that can be executed by a timer device from user-specified schedule-parameter data.

FIG. 7 is an example of data dependencies that may be involved in generating a schedule that can be executed by timer device 101 from user-specified schedule-parameter data. Using smart device 102, the earliest time at which the timer device 101 may activate ("schedule start time 701"), a list of daily set-times 702, a conflict window of time ("arbitration window 709"), and rules for how the system will prioritize one type of schedule entry over another (the rules comprising, for example, priority rankings 708) may be specified. Information about the geographic location where timer device 101 is deployed, comprising longitude and latitude 703 and local elevation 704, may be used in generating schedule data that can be executed by timer device 101. Longitude and latitude 703 and local elevation 704 may be user-specified or detected automatically. In certain embodiments, a user may specify whether longitude and latitude 703 and local elevation 704 should be detected automatically. Using this information, a list of schedule entries may be generated according to rules for each schedule source. For the daily schedule 705, entries (e.g., Daily Schedule Entries) may be generated with the user-specified times of day as offsets into successive days according to the number of hours and minutes in a 24-hour day. For the solar schedule 706, entries (e.g., Solar Schedule Entries) may be generated for sunrise and sunset on successive days according to, for example, the increase or decrease of daylight. For the lunar schedule 707, entries (e.g., Lunar Schedule Entries) may be generated for successive cycles of moon overhead, moonset, moon underfoot, and moonrise according to, for example, calculations of the moon's position based on celestial mechanics. These different types of entries may be interleaved into one or more schedules following the user-specified arbitration rules such that a schedule entry with low priority (as defined by the user in the rankings list 708) will be skipped if a higher-priority schedule entry would occur within the arbitration window 709. Schedule entries may be generated and interleaved into one or more schedules by software routines that compare a lower-priority candidate entry to two other entries: the previous higher-priority entry already accepted into the one or more interleaved schedules, and the next higher-priority entry that may preclude the current entry from being accepted into the one or more interleaved schedules. In one embodiment, these comparisons may be performed respectively by two separate software routines, represented as a look ahead filter 710 and a look behind filter 711. As a result of applying these operations, the one or more interleaved schedules 712 may conform to the user's desired arbitration rules, as discussed above with respect to, for example, FIG. 5.

Figure 8:
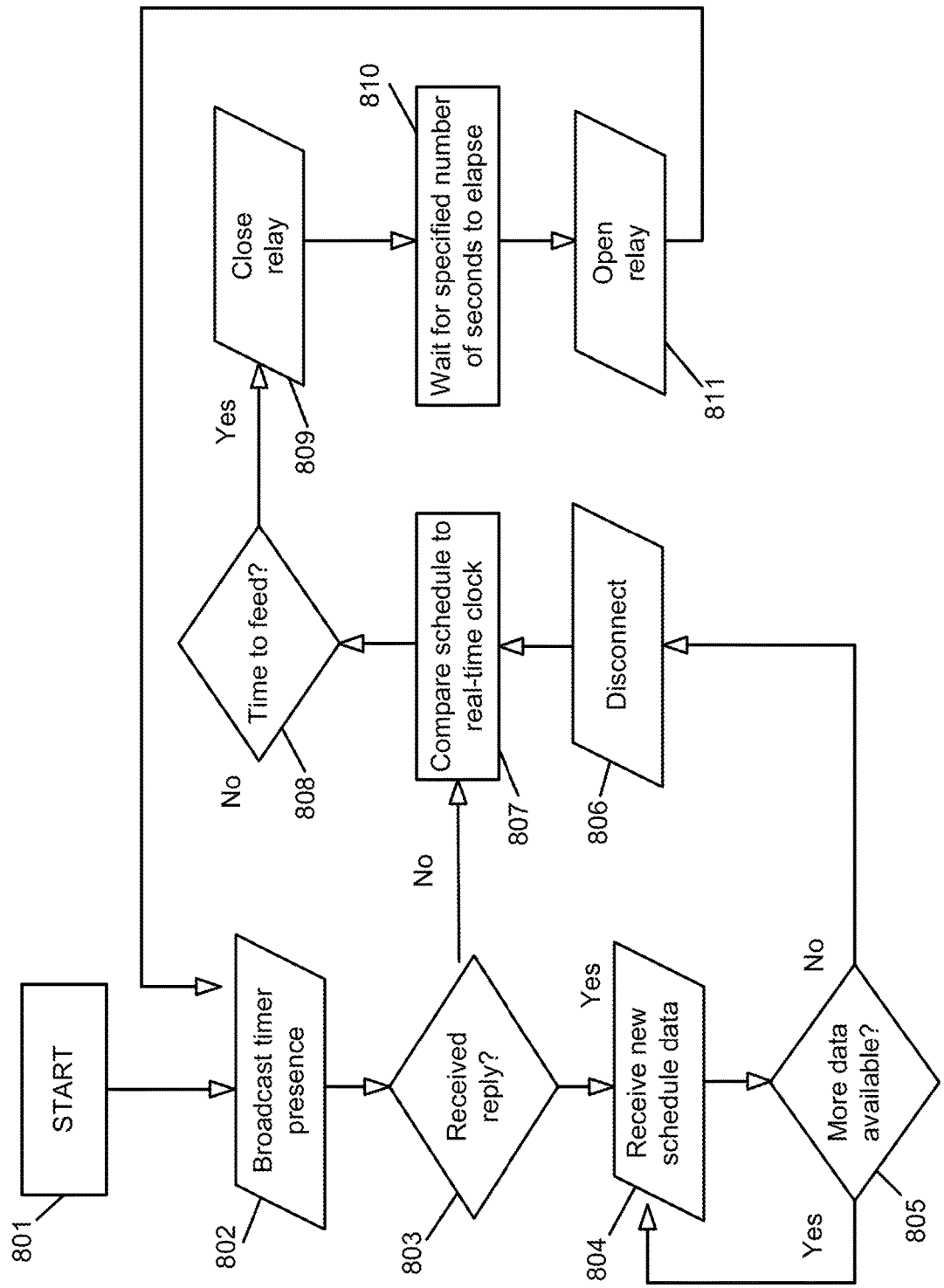
FIG. 8 is a flow diagram illustrating an exemplary behavior of firmware on a microcontroller unit.

Timer device 101 may have firmware programmed on MCU 401. FIG. 8 is an example of the behavior of the firmware. After an initial startup sequence 801, MCU 401 may perform two functions: communicating with smart device 102 and executing a schedule. A routine that communicates with smart device 102 may energize radio 407 to broadcast timer device's 101 presence at 802 so that smart device 102 may identify timer device 101. If smart device 102 establishes a connection at 803, timer device 101 and smart device 102 will exchange data at 804 and 805 until smart device 102 disconnects at 806, at which point timer device 101 can power down the radio 407.

One or more on-board real-time clocks may allow the timer to act on the schedule data conveyed from the application. The routine that executes the schedule will first compare the pending schedule entry to the value of the real-time clock 409 at 807. Schedule entries may be associated with a timestamp, which may be stored as, or may be decoded into, a numeric format compatible with the output of the real-time clock 409, such as a count in seconds or fractions of a second starting from some prior date and time. If the numeric value of said timestamp is less than or equal to the output of the real-time clock 409 at 808, then the timer device 101 will close the relay 402 at 809, thereby energizing the motor 403. One or more schedule entries may be associated with a feed duration, which may be stored as, or may be decoded into, a numeric format compatible with the output of the real-time clock 409. Having closed relay 402 at 809, timer device 101 may wait at 810 for the duration thus specified, and then open the relay 402 at 811. In the described embodiment, schedule entries may store the duration time as an offset in seconds from the starting timestamp. In another embodiment, both start-of-feed and end-of-feed times may be stored at the same level of precision, either as offsets from a common epoch or from prior schedule events. In the described embodiment, timer device 101 may perform one or more of its duties (e.g., communicating with smart device 102, energizing motor 403) in a loop, alternating between them. In another embodiment, one or more duties may be run concurrently, using, for example, coroutines, multiple processor cores, or another concurrency primitive.

The on-board relay 402 may close on schedule to complete a circuit comprising main battery 404 and motor 403 to cause motor 404 to be energized and dispense feed. Relay 402 may be rated for and capable of the loads imposed by motor 403 under load and up to a trip point. An application on smart device 102 may permit calibration of timer device 101 to monitor motor's 403 load by running several tests of the dispenser before and after filling hopper with feed and logging the average electrical current draw of each test. The tests may include, for example, measuring the inrush and/or steady state current drawn by motor 403 when there is no feed in the hopper (a "no-load" condition). The tests may include conducting the same measurement when there is a typical amount of feed in the hopper (an "under-load" condition). Timer device 101 may monitor and log the current draw at one or more feed set-times. If the current draw reaches the previously determined "no-load" level for a number of consecutive feed set-times, timer device 101 may determine the hopper is empty. In certain embodiments, timer device 101 may calculate the ratio between the peak current drawn by motor 403 (e.g., the inrush current) and the steady state current drawn by motor 403. This ratio may be used to determine whether the hopper is empty or whether motor 403 stalled. For example, the inrush current (e.g., the peak current draw) of motor 403 may be measured as soon as motor 403 is energized. Approximately at least one second after energizing motor 403, the normal operating current (e.g., steady state current) may be measured. If the ratio of the normal operating current to the inrush current is equal to or about zero and the normal operating current is near the "no-load" level determined during calibration testing, the hopper may be considered empty. If the ratio is from about 0.25 to about 0.75 and the normal operating current is near the current draw observed during the "under-load" level determined during calibration testing, the hopper may be considered to be operating normally. If the ratio is equal to 1 or about 1, motor 403 may be considered to have stalled. In some embodiments, the ratio of the inrush current to the normal operating current may be used to determine whether the hopper is empty or operating normally, or whether motor 403 stalled without relying on a comparison to the steady-state current during calibration testing. When timer device 101 determines that the hopper is empty, it may cease energizing the relay on schedule. Upon downloading a full log, the user may be able to identify the day and time that the hopper reached empty. Also, when configuring a schedule, the application may calculate and predict in advance when the hopper is likely to become empty based on historical data, and, during configuration, display this future date and time. The schedule may, nevertheless, be accepted. The schedule may be set to broadcast less feed per day so as to extend the time before the hopper becomes empty. The schedule may be revised to broadcast more feed per day to have the date the hopper becomes empty coincide with the date of an intended visit to the hopper to fill it.

Feeder 200 may include over-current protection. Automatic feeders may stall for a number of reasons. Moisture may intrude the hopper causing clumping of feed that clogs the dispenser mechanism. Feed may contain twigs or rocks that stall the mechanism. Over-current protection may be used to allow for an auto-reset when the failed condition is removed.

Using a software application, such as a smartphone application on smart device 102, the user can poll timer device 101 to retrieve a snapshot of timer device's 101 current configuration, as well as a full log of other data concerning timer device's 101 current status and past performance. A snapshot of the current configuration may include one or more types data, such as: data entered upon initially setting up timer device 101 (or modified since), such as a name of timer device 101; data sent over to timer device 101 when the current schedule was conveyed to it, such as location (e.g., latitude, longitude, elevation) and a current schedule configuration summary (e.g., a brief synopsis of the parameters by which current schedule was constructed, such as "15 minutes before sunrise; 90 minutes before sunset; 30 minutes after moon overhead; 30 minutes after moon underfoot; N/A moonrise; N/A moonset; Arbitration 'On' and defaulting to solar events with a total window of 60 minutes"); and information extracted from the log, which is created by and stored on timer device 101, such as current date and time on the timer, date and time that the current schedule was received by timer device 101, main battery's 404 nominal voltage and level, and backup battery's 406 level.

A full log of up to multiple years' worth of rolling data may include a header and individual log entries, each of which include data extracted from the schedule as well as data gathered by sensors. Such data may include header information (e.g., name of timer, log start date and time, log end date and time, time zone, daylight saving time (Yes or No), location including latitude, longitude, and elevation) and log entries for one or more possible events including whether acted upon or not (e.g., date; time; event type such as test, sunrise, moon overhead, daily; reason why feeding did not occur such as "main battery power too low" or "schedule specified that this entry should be skipped"; main battery 404 level, current draw of motor 403; temperature; humidity; barometric pressure).

Figure 9:
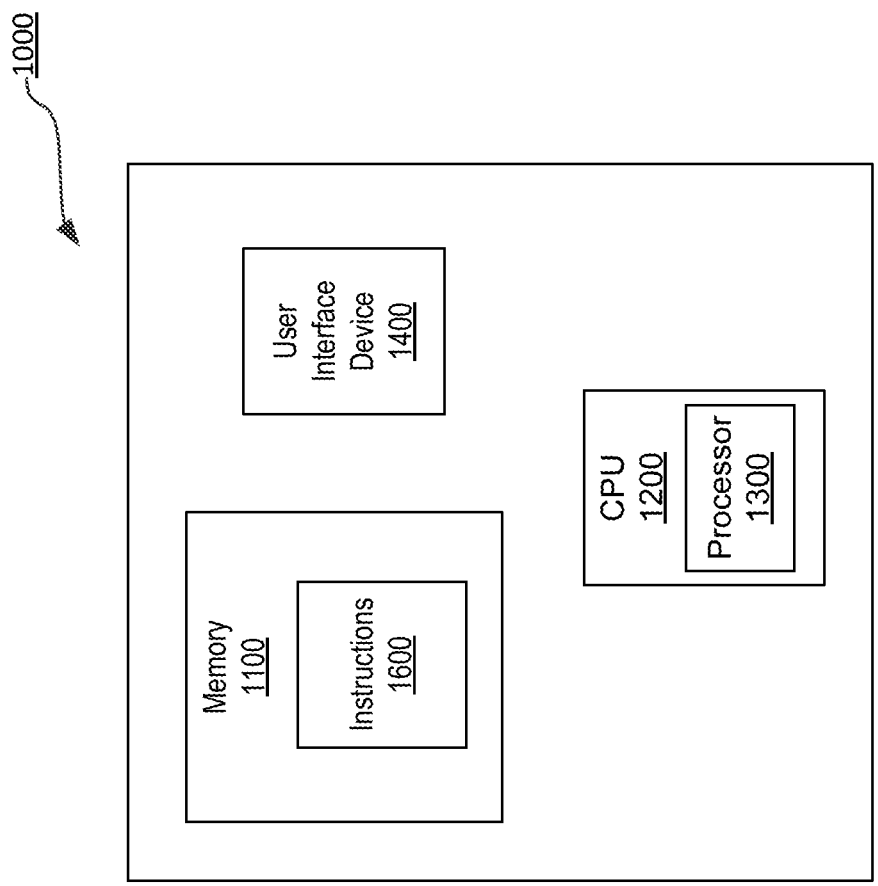
FIG. 9 illustrates components of an exemplary system for scheduling tasks based on predicted animal behavior.

The components of system 100, illustrated in FIG. 9 as exemplary system 1000, may include any combination of an assembly of hardware, software, and/or firmware, including a memory 1100, and a central processing unit ("CPU") 1200. Memory 1100 may include any type of RAM or Read-only Memory ("ROM") embodied in a physical storage medium, such as magnetic storage including floppy disk, hard disk, or magnetic tape; semiconductor storage such as solid state disk (SSD) or flash memory; optical disc storage; and/or magneto-optical disc storage. CPU 1200 may include one or more processors, such as processor 1300, for processing data according to a set of programmable instructions 1600 or software stored in the memory 1100. The functions of CPU 1200 may be provided by a single dedicated processor 1300 or by a plurality of processors. Moreover, processors may include, without limitation, digital signal processor (DSP) hardware, or any other hardware capable of executing software. System 100 may comprise one or more user interface devices 1400, such as a display, printer, monitor, keyboard, touch screen, stylus, speaker, text-to-speech system, microphone, and/or mouse.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An automatic feeding device for animals, comprising:
    a hopper including a bulk container for storing feed and a feed outlet;
    a dispenser including:
        an enclosure containing a power source, an electric motor, and a controller; and
        dispensing means connected to the electric motor and configured to dispense feed received from the feed outlet when the electric motor is energized; and
    wherein the controller is configured to energize the electric motor according to a multi-day schedule of accepted dispensing times generated based at least in part on:
        a selection of at least one astronomical event and at least one associated offset time,
        determination of multiple candidate dispensing times, and
        remediation of at least one conflict between two or more of the multiple candidate dispensing times.

2. The automatic feeding device of claim 1, wherein:
    the dispensing means comprises a rotating member attached by a shaft to the electric motor.

3. The automatic feeding device of claim 1, wherein:
    the controller is configured to determine, based on a current draw of the electric motor, a fullness of the hopper or a status of the electric motor.

4. The automatic feeding device of claim 3, wherein the controller is configured to determine the fullness of the hopper and to skip a scheduled energizing of the electric motor based on the determined fullness of the hopper.

5. The automatic feeding device of claim 1, wherein:
    the multi-day schedule includes or indicates image data acquisition times; and
    the controller is configured to provide, according to the multi-day schedule, an indication to an imaging device to acquire image data.

6. The automatic feeding device of claim 1, wherein:
the automatic feeding device further comprises environmental sensors; and
the controller is configured to adjust the multi-day schedule based on data received from the environmental sensors.

7. The automatic feeding device of claim 1, wherein:
the controller is configured to receive, from a smart device, the multi-day schedule or the selection of the at least one astronomical event and the at least one associated offset time.

8. The automatic feeding device of claim 1, wherein:
the controller is further configured to:
receive the selection of the at least one astronomical event and the at least one associated offset time;
obtain location information;
determine, using the location information, at least one candidate dispensing time corresponding to the at least one astronomical event and the at least one associated offset time; and
determine the multi-day schedule based on the at least one candidate dispensing time.

9. The automatic feeding device of claim 8, wherein:
the controller is further configured to receive elevation information and determine the at least one candidate dispensing time using the elevation information.

10. The automatic feeding device of claim 8, wherein:
receiving the selection of the at least one associated offset time includes receiving an indication of an animal species; and
the controller is further configured to determine an offset time value based on the indicated animal species.

11. An automatic feeding system for animals, comprising:
an automatic feeding device comprising:
a hopper including a bulk container for storing feed and a feed outlet;
a dispenser including:
an enclosure containing a power source, an electric motor, and a controller; and
dispensing means connected to the electric motor and configured to dispense feed received from the feed outlet when the electric motor is energized; and
wherein the controller is configured to energize the electric motor according to a multi-day schedule of accepted dispensing times; and
a smart device configured to:
receive a selection of at least one astronomical event and at least one associated offset time;
determine at least one candidate dispensing time corresponding to the at least one astronomical event and the at least one associated offset time, the at least one candidate dispensing time including multiple candidate dispensing times;
determine the multi-day schedule using the at least one candidate dispensing time; and
provide the multi-day schedule to the controller.

12. The system of claim 11, wherein:
the automatic feeding device is configured to communicate wirelessly with the smart device.

13. The system of claim 11, wherein:
the system further comprises an imaging device;
the multi-day schedule includes or indicates image data acquisition times; and
the controller is configured to provide, according to the multi-day schedule, an indication to the imaging device to acquire image data.

14. The system of claim 11, wherein:
the automatic feeding device further comprises environmental sensors; and
the controller is configured to adjust the multi-day schedule based on data received from the environmental sensors.

15. The system of claim 11, wherein:
the smart device is configured to:
obtain location information using a GPS function or wireless network service function; and
determine the at least one candidate dispensing time is determined using the obtained location information.

16. The system of claim 11, wherein:
the controller is further configured to perform an automatic calibration routine, in response to instructions received from the smart device, to determine a relationship between a current draw of the electric motor and a fullness of the hopper or a status of the electric motor.

17. The system of claim 11, wherein:
the smart device is further configured to obtain log data from the automatic feeding device;
determine, based on the log data, a predicted day and time when the hopper will become empty; and
display the predicted day and time.

18. The system of claim 17, wherein:
the smart device is further configured to adjust the multi-day schedule to increase or reduce an amount of feed dispensed based on the predicted day and time when the hopper will become empty.

19. The system of claim 11, wherein:
the at least one candidate dispensing time includes multiple candidate dispensing times; and
determining the multi-day schedule includes detecting and remedying at least one conflict between two or more of the multiple candidate dispensing times.

* * * * *